March 10, 1925.
T. B. LASHAR
1,528,833
PROCESS OF MANUFACTURING SPOONS, FORKS, AND SIMILAR ARTICLES
Filed April 27, 1923
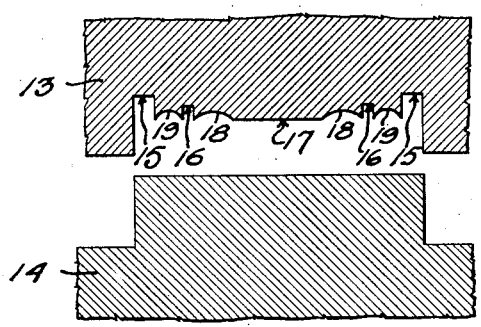
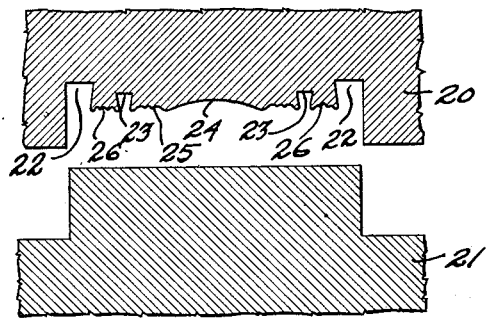
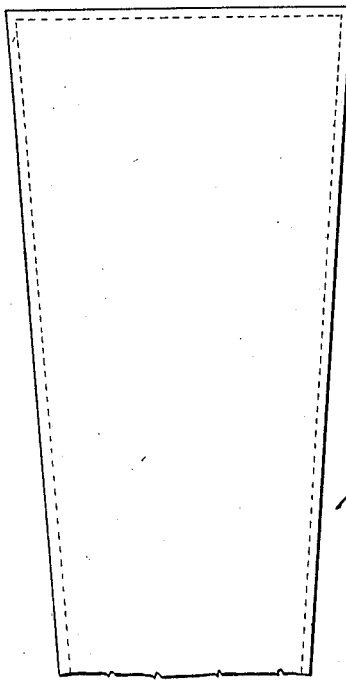
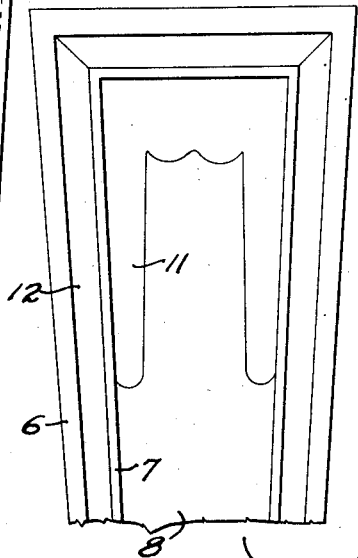
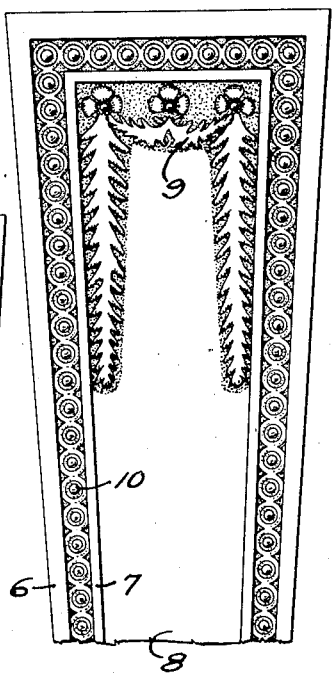
Inventor
Thomas B. Lashar Patented Mar. 10, 1925.

1,528,833

UNITED STATES PATENT OFFICE.

THOMAS B. LASHAR, OF FAIRFIELD, CONNECTICUT, ASSIGNOR TO ASSOCIATED SILVER COMPANY, OF CHICAGO, ILLINOIS, A CORPORATION OF ILLINOIS.

PROCESS OF MANUFACTURING SPOONS, FORKS, AND SIMILAR ARTICLES.

Application filed April 27, 1923. Serial No. 635,079.

*To all whom it may concern:*

Be it known that I, THOMAS B. LASHAR, a citizen of the United States, residing at Fairfield, in the county of Fairfield and State of Connecticut, have invented certain new and useful Improvements in Processes of Manufacturing Spoons, Forks, and Similar Articles, of which the following is a specification.

The present invention relates to those steps in the process of manufacturing spoons, forks, and similar articles whereby such are given surfacing and ornamentation, imparting thereto æsthetic value or artistic merit.

The principal objects of the invention are, to enable the production of high grade articles of the character described reducing the amount of polishing necessary to condition same for the trade, and to provide a process applicable to articles made of sterling silver and other precious metals and particularly well adapted to the manufacture of articles made of alloys, such as nickel silver or German silver giving thereto great definition of the ornamentation so that such has all of the clear fine appearance of the articles made of the softer and more malleable materials such as sterling silver.

Having formed, by way of example, the handles of spoons, forks or knives by practicing any of the known processes, such as by use of "grading-in" rolls, dies for cutting outline, etc., the handles are acted upon, according to my present process to impart thereto plain surfaces,—flat, concave, or convex—substantially as they are to be in the finished article, without the necessity of subsequent polishing, and then imparting to such handles the ornamentation of a more complex nature such as figure work which is brought out with great nicety and definition. This is preferably accomplished by the use of dies, the plain surfacing resulting from the use of a die having highly polished surfaces which are a replica of the design that is to be manufactured, with the exception that where any figure work or ornamentation is desired, the die is eased away and recessed so that the part to receive the figure work is either not touched by the die or if engaged such merely tends to shape the metal so as to more effectively receive the figure work, the material flowing, so to speak, into the recesses as the material is struck by the die. In this way the highly polished surfaces of the first die smooth and compact the surfaces of the handles, which are to be substantially plain without the necessity of subsequent polishing in order to condition the articles for the trade. The second die is in the converse,—eased away and recessed at that portion where the polished plain surfaces appear in the first die to that extent so as to not engage the substantially plain surfaces provided on the work by use of the first die and recessed at other portions to provide the figure work of the metal by striking the same or by pressure.

Another object of the invention is therefore to enable such steps in the process of manufacture of spoons, forks and similar articles to be accomplished by the use of dies and in such a manner that the life of the dies is prolonged, for, according to the processes now in general use, the die has to hit a terrific blow to form all of the substantially plain surfaces and figure work at once, resulting in breakage, wear and short life of the die.

Other objects and advantages of the invention will appear in the following detailed description, taken in connection with the accompanying drawings, forming a part of this specification, and in which drawings:

Figure 1 is an enlarged cross sectional view through separated companion dies which may first be used in carrying out the process.

Figure 2 is a similar view of companion dies which may be used in the second step of the process.

Figure 3 is an enlarged fragmentary view in plan of the handle portion of a spoon, or similar article as it appears when formed by any known process to primarily shape the article.

Figure 4 is a similar view but showing the material after having been acted upon by the die shown in Figure 1.

Figure 5 is a similar view showing the material as having been acted upon by the die shown in Figure 2.

It is to be understood that the dies shown in the drawings and representation of the handle portions during various stages of manufacture of the articles are merely by way of example; that by the term "substantially plain surfaces" reference is had to such surfaces as the frame 6, fillet 7, and field 8 shown in Figures 4 and 5 or any other substantially plain surface, whether flat, concave or convex in contradistinction to "figure-work" which is used to define ornamentation of a more complicated nature, such as the more pronounced ornamentation as the festoon 9 and beaded moulding 10.

In practice, the first step is to act upon the stock, which has been primarily shaped as shown in Figure 3, to smooth and condense the material where such substantially smooth surfaces as indicated by 6, 7 and 8 are desired, crowding some of the material to form protuberances as at 11 and 12 where figure work is later to be provided. This may be accomplished by use of companion dies 13 and 14 such as are shown in Figure 1, which by way of example illustrate the die 13 as alone shaped to ultimately provide for both substantially plain surfaces and figure work on one face of the handle of a spoon, it being understood that the die 14 may also be arranged for such. The die 13 is provided with polished surfaces 15, 16 and 17 and recesses 18 and 19 so arranged that as the work is struck one or two blows, the substantially plain surface of the border 6, fillet 7 and field 8 will be smoothed and condensed and the material crowded into the recesses 18 and 19 to provide the protuberances 11 and 12. The highly polished surfaces 15, 16 and 17 will provide these substantially plain surfaces with such nicety as to not require subsequent polishing in order to condition the article for the trade and the die may be readily kept clean and sharp due to the absence of any relatively small recesses of an intricate nature.

The next step is to force or press the material of the protuberances to present to the eye figure work without disturbing the substantially plain surfaces. This may be accomplished by use of companion dies 20 and 21 shown in Figure 2, which by way of example illustrates the die 20 as alone shaped to provide figure work on one face of the handle of a spoon, it being understood that the die 21 may also be arranged for such. The die 20 is provided with recesses 22, 23 and 24 so deep that they will receive the frame 6, fillet 7 and in no way disturb the polished surfaces thereof nor the field 8, being "eased away" from such field, and is further provided with the matrix of figure work desired such as at 25 and 26 to provide the festoon 9 and bead moulding 10. When the material is subjected to pressure, as by use of a hydraulic press, or a blow, as by use of a drop press, through use of die 20 material forming a part of the protuberances 11 and 12 will be displaced to provide the figure work. The die 20, not being required to shape the border 6 and fillet 7 or otherwise in general smooth and condense the substantially plain surfaces of the finished article, will produce figure work with great nicety and definition with comparatively little wear or strain on the matrix and hence will remain in good condition for a great length of time.

The process is particularly well adapted to the manufacture of the harder and less malleable metals or alloys such as nickel silver or German silver, as compared with sterling silver although is equally applicable to such.

I claim:

1. Those steps in the manufacture of spoons, forks and similar articles which consists in first smoothing and condensing a portion of the stock into substantially smooth finished surfaces and crowding other of the material into protuberances and second acting upon said protuberances to provide figure work without disturbing the substantially smooth surfaces.

2. Those steps in the manufacture of spoons, forks and similar articles which consists in first smoothing and condensing a portion of the stock into substantially smooth surfaces and crowding other of the material into protuberances and second acting upon said protuberances to provide figure work.

3. Those steps in the manufacture of spoons, forks and similar articles which consists in first striking the stock with a die formed to provide substantially plain surfaces on the stock, and then pressing the stock with a die formed to provide figure work on other portions of the stock and not disturb the plain surfaces formed by the first step.

4. Those steps in the manufacture of spoons, forks and similar articles which consists in first smoothing and condensing a portion of the stock into substantially smooth finished surfaces and crowding other of the material into protuberances and then pressing the protuberances with a die formed to provide figure thereof without disturbing the substantially smooth surfaces.

5. Those steps in the manufacture of spoons, forks and similar articles which consists in first smoothing and condensing a portion of the stock into substantially smooth surfaces and crowding other of the material into protuberances and then pressing the protuberances with a die formed to provide figure thereof.

THOMAS B. LASHAR.